Nov. 10, 1964     D. J. REED     3,156,042
METHOD OF MAKING DUPLEX WALL TUBING
Filed April 10, 1962
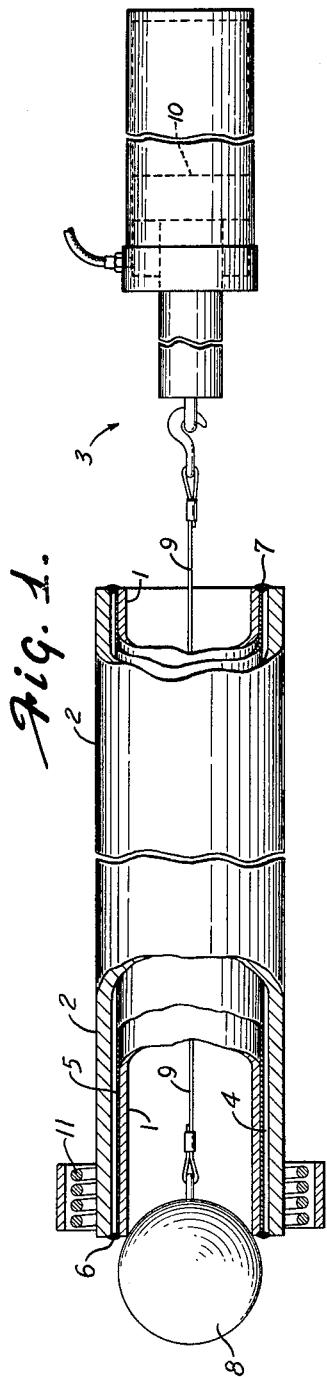
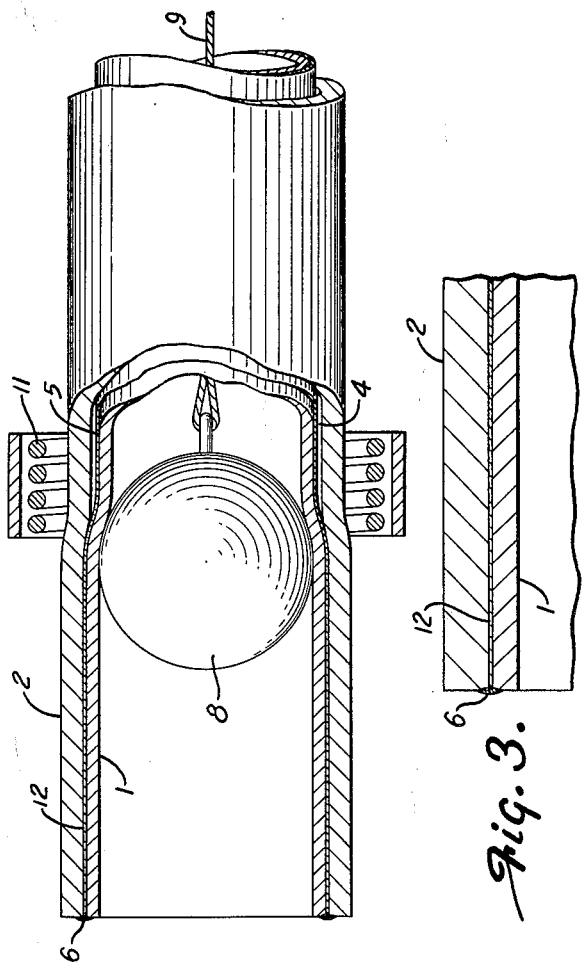
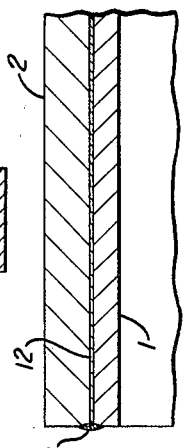
INVENTOR.
Daniel J. Reed
BY
Andrus & Starke
ATTORNEYS

United States Patent Office 3,156,042
Patented Nov. 10, 1964

3,156,042
METHOD OF MAKING DUPLEX WALL TUBING
Daniel J. Reed, Milwaukee, Wis., assignor to A. O. Smith Corporation, Milwaukee, Wis., a corporation of New York
Filed Apr. 10, 1962, Ser. No. 186,459
1 Claim. (Cl. 29—471.5)

This invention relates to a process of manufacturing duplex wall tubing.

A tube member of double wall construction may be manufactured to establish different characteristics at the inner and outer surfaces of the tube member; for example, as shown in U.S. Patent 3,025,596 to C. T. Ward et al. The inner and outer wall members forming the composite tube should normally be maintained in permanent engagement.

Generally, duplex wall tubing has been relatively expensive to manufacture or has not produced high quality attachment of the tube walls. In prior art processes, the tubes must be assembled with relatively small clearance therebetween. Consequently, the tubes must be accurately formed and are difficult to assemble for subsequent expansion.

The present invention is directed to the method of forming a double wall tube of suitable metal having an excellent interface joint by brazing the inner and outer walls to each other along the interface of the walls.

In accordance with the present invention, the tubes are coaxially assembled and the ends of the tubes welded or otherwise sealed to form a hermetically sealed annular chamber or clearance therebetween. A brazing or other suitable high temperature bonding material is disposed between the tubing prior to the sealing of the ends and any desired vacuum or atmosphere is established within the hermetically sealed chamber. The tubing is then heated to the bonding temperature and simultaneously the inner tube is expanded and stretched into firm engagement with the outer tubing preferably by relative movement between the tubing and a suitable mandrel passing through the tubing. Induction heating provides a particularly simple means for successively heating the concentric tubes immediately prior to expanding engagement of the corresponding area with the mandrel.

The drawing furnished herewith illustrates the best mode presently contemplated for carrying out the invention.

In the drawing:

FIG. 1 is an elevational view with parts broken away of a duplex wall tube assembled for manufacture in accordance with this invention;

FIG. 2 is a fragmentary view similar to FIG. 1 with portions of the duplex wall tube in the formed condition; and FIG. 3 is a fragmentary enlarged sectional view of the completed duplex wall tube.

Referring particularly to FIG. 1 in the drawing, the duplex wall tube includes an inner metal tube wall 1 and an outer metal tube wall 2 coaxially and concentrically supported adjacent a forming apparatus 3. A relatively substantial clearance 4 is provided between the tubes 1 and 2 and allows ready telescoped assembly of the tube walls 1 and 2. A suitable brazing material 5 such as copper, brass, silver or solder covers the outer surface of the inner tube 1 within the annular clearance 4. End welds 6 and 7 join the opposite ends of the tube walls 1 and 2 to form a hermetic seal of the clearance 4. A vacuum or suitable brazing gas atmosphere may be provided in the hermetically sealed clearance 4.

A forming ball 8 is coaxially mounted with the tube walls 1 and 2 and is connected by a suitable cable 9 or the like to a hydraulic piston 10 which is adapted to pull the ball through the concentric tube walls 1 and 2.

An induction heating coil 11 is movably mounted for simultaneous movement with and immediately forwardly of the forming ball 8. The induction heating coil 11 is adapted to induce circulating currents in tube walls 1 and 2 and increase the temperature of the tube walls 1 and 2 to the bonding temperature of the brazing material 5.

In operation, the tube walls 1 and 2 are concentrically arranged with the welds 6 and 7 hermetically sealing clearance 4. A suitable vacuum or atmosphere is provided within clearance 4 to promote the brazing of the walls to each other. The sealed assembly of tube walls 1 and 2 is properly mounted in the forming apparatus with the ball 8 and the induction heating coil 11 adjacent one end of the unit, as shown in FIG. 1. The induction heating coil 11 is energized and progressively moved axially of the concentric tube walls 1 and 2 to increase the temperature thereof to the brazing temperature of the brazing material 5. The ball 8 is pulled through the inner tube wall 1 immediately behind the heating coil 11 and causes the inner tube wall 1 to move outwardly into firm positive engagement with the outer tube wall 2 with the tube walls 1 and 2 at the brazing temperature. This forms a permanent brazed joint 12 between the inner and the outer tube walls and facilitates the stretching of the tube walls 1 and 2.

In the illustrated embodiment of the invention, as shown in FIG. 2, the ball 8 is sufficiently large to cause radial expansion of the outer tube wall 2 and insure a permanent set of the inner tube wall 1. This provides a positive acting bond between the tubes 1 and 2, as shown in FIG. 3.

The clearance 4 allows ready assembly of the tube walls 1 and 2 and the hermetic seal formed by the welds 6 and 7 permits establishment of a suitable atmosphere in the clearance 4 for creating a high quality bond of the tube walls 1 and 2. The induction heating coil 11 permits rapidly raising the temperature of the walls 1 and 2 to the bonding temperature.

The present invention provides a strong bond between the walls of a duplex wall tube and the like by a relatively inexpensive and rapid process.

Various modes of carrying out the invention are contemplated as being within the scope of the following claim particularly pointing out and distinctly claiming the subject matter which is regarded as the invention.

I claim:

The process of making a duplex wall tubing, which comprises assembling a pair of individual metal tubes with a clearance therebetween and being capable of being expanded without cracking, said tubes carrying a brazing agent in said clearance, hermetically closing the clearance at the ends of the tubes, progressively induction heating the tubes from one end to other and raising the temperature to a brazing temperature, and progressively expanding the inner tube into engagement with the outer tube immediately rearwardly of the heated area to bond the inner tube to the outer tube, said expansion of the inner tube also expanding the outer tube to establish a permanent stretch of the outer tube.

References Cited in the file of this patent
UNITED STATES PATENTS

| | | |
|---|---|---|
| 1,392,416 | Henderson | Oct. 4, 1921 |
| 2,086,135 | McIlvane | July 6, 1937 |
| 2,263,714 | Bloomfield et al. | Nov. 25, 1941 |
| 2,820,286 | Andrus | Jan. 21, 1958 |
| 2,975,259 | Osborne | Mar. 4, 1961 |
| 3,025,596 | Ward et al. | Mar. 20, 1962 |
| 3,068,562 | Long | Dec. 18, 1962 |